United States Patent [19]
Smith

[11] Patent Number: 5,097,814
[45] Date of Patent: Mar. 24, 1992

[54] TUNED AIR INSERT FOR INTERNAL COMBUSTION ENGINES AND RELATED PROCESS

[76] Inventor: George C. Smith, 1738 Edeline Ave., McKinleyville, Calif. 95521

[21] Appl. No.: 583,243

[22] Filed: Sep. 17, 1990

[51] Int. Cl.⁵ .......................................... F02M 29/00
[52] U.S. Cl. ...................................... 123/590; 138/44; 251/121
[58] Field of Search ............... 123/52 M, 590; 138/43, 138/44, 46; 137/10, 47; 251/121, 124

[56] References Cited

U.S. PATENT DOCUMENTS

| | | | |
|---|---|---|---|
| 3,952,776 | 4/1976 | Eversole et al. | 251/121 |
| 4,003,405 | 1/1977 | Hayes et al. | 137/810 |
| 4,015,574 | 4/1977 | Hanff | 261/79 R |
| 4,020,859 | 5/1977 | Malphettes et al. | 137/14 |
| 4,148,285 | 4/1979 | Ahlers | 261/79 R |
| 4,187,819 | 2/1980 | Longobardi | 261/79 R |
| 4,209,472 | 6/1980 | Child et al. | 261/23 A |
| 4,228,770 | 10/1980 | Boyesen | 123/73 V |
| 4,291,860 | 9/1981 | Bauer | 251/129.02 |
| 4,295,458 | 10/1981 | Pellerin | 123/590 |
| 4,307,697 | 12/1981 | Ong | 123/590 |
| 4,356,798 | 11/1982 | Sakaoka et al. | 123/52 MF |
| 4,463,742 | 8/1984 | Williams | 123/590 |
| 4,474,145 | 10/1984 | Boyesen | 123/73 PP |
| 4,474,163 | 10/1984 | Linder et al. | 123/590 |
| 4,492,212 | 1/1985 | Dooley | 123/590 |
| 4,690,107 | 9/1987 | Emler et al. | 123/65 V |
| 4,711,225 | 12/1987 | Holderle et al. | 123/590 |
| 4,712,526 | 12/1987 | Caughran | 123/307 |
| 4,715,354 | 12/1987 | Longobardi | 123/590 |
| 4,770,151 | 9/1988 | Finlay | 123/590 |
| 4,836,151 | 6/1989 | Litjens et al. | 123/65 V |
| 4,879,976 | 11/1989 | Boyesen | 123/651 |

*Primary Examiner*—David A. Okonsky
*Attorney, Agent, or Firm*—Nixon & Vanderhye

[57] ABSTRACT

The present invention seeks to provide a simple, low cost and easy-to-install (or remove) device for two-cycle engines which improves engine efficiency through more complete combustion, resulting in increased engine rpm and a decrease in emissions. The invention specifically relates to an insert device which is located upstream of the carburetor, preferably in a coupler which typically extends between an air cleaner and the carburetor of a two-cycle engine. The insert itself is generally formed as a tubular member (of one or more pieces) tapering from a larger inlet side to a smaller outlet side, with or without surface irregularities, i.e., ribs, flutes, etc., formed on its interior surface. It is important that the tuned air insert be located such that its lower edge, i.e., on the outlet side, be raised above the coupler outlet and carburetor inlet, and that the coupler surrounding the tuned air insert have a diameter sufficiently greater than that of at least a portion of the insert, so as to create a chamber surrounding the insert, immediately above and open to the carburetor inlet.

27 Claims, 2 Drawing Sheets

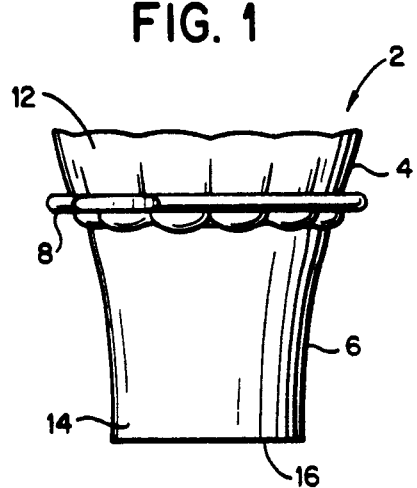
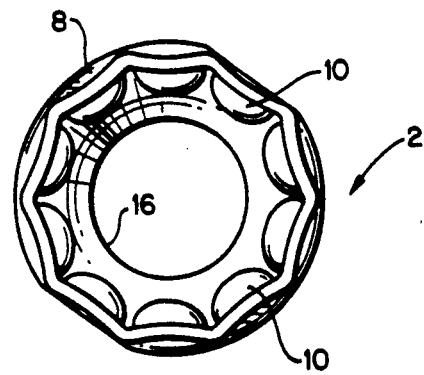
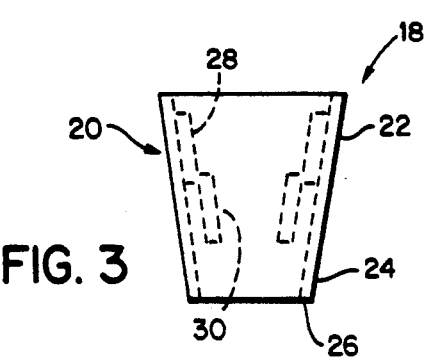
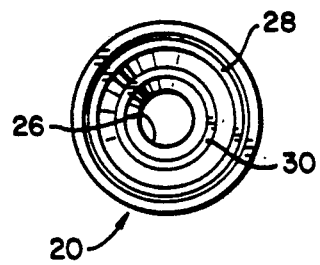
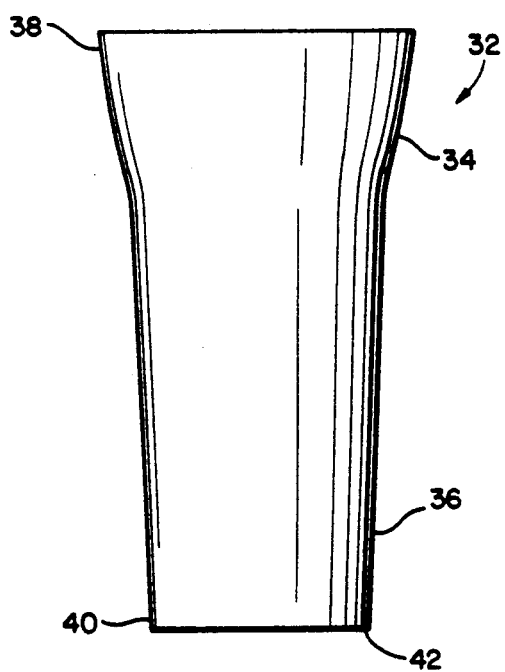
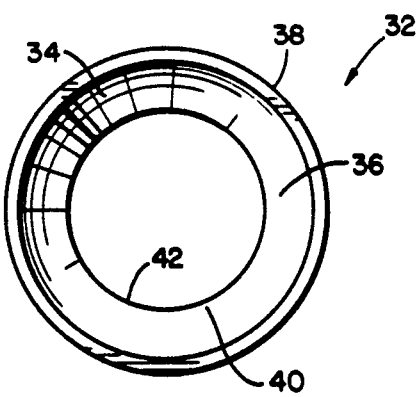

TUNED AIR INSERT FOR INTERNAL COMBUSTION ENGINES AND RELATED PROCESS

BACKGROUND AND SUMMARY OF THE INVENTION

This invention relates generally to a combustion enhancing device for an internal combustion engine and, more specifically, to a device for insertion within the air intake system of a two cycle engine and related process which results in more complete combustion as evidenced by increased engine rpm.

The subject of improving combustion engine efficiency and reducing a harmful emissions continues to be of major concern not only from a fuel conservation standpoint but also from an environmental standpoint, since inefficient or incomplete combustion produces harmful emissions, principally in the form of unburned hydrocarbons.

There have been many attempts to improve or enhance combustion efficiency by the utilization of various devices or "add-ons" which are generally designed for incorporation within the intake system, between the carburetor and the combustion chamber.

For example, Hanff (4,015,574) discloses a plate with radial spokes which is positioned between the carburetor outlet and the intake manifold, and is utilized for creating turbulence in the fuel air mixture. The plate is intended to improve engine efficiency and decrease automotive pollutants.

Ong (4,307,697) discloses a device or insert which is located in the inlet manifold with an internal combustion engine and which is provided with protrusions on its interior surface. The device is said to improve the efficiency of the engine by creating complex swirls in the air fuel mixture downstream of the carburetor.

Williams (4,463,742) discloses a fuel economizer in the form of an insert which fits between the carburetor and the inlet manifold and which has a plurality of protrusions extending into the fuel/air stream.

Linder (4,474,163) discloses an apertured shield for improving the combustion in an internal combustion engine. The shield includes a plurality of spring tongues directed radially inward, and the shield is positioned in close proximity to an injection valve to cause turbulence in the flow into the combustion chamber.

Dooley (4,492,212) discloses an insert positioned in the intake manifold of an internal combustion engine for increasing turbulence and for improving the efficiency of the engine. The insert is located downstream of the carburetor.

Holderle (4,711,225) discloses a connecting piece for insertion between the carburetor and the combustion chamber of an internal combustion engine for minimizing fuel film on the inner surface of the connector. The device is apparently designed to prevent fuel film deposited on the inner wall of the connecting piece from being completely aspirated all at once into the combustion chamber which would cause over-enrichment of the mixture and hence a drop in rpm. This patent mentions specific applicability to two cycle chain saw engines.

Caughran (4,712,526) discloses the use of a turbine insert to create turbulence in the air/fuel mixture, designed for mounting on the piston head.

Litjens (4,836,151) also discloses the utilization of a turbine fan in a two cycle internal combustion engine.

The following patent documents also disclose various kinds of insert devices located downstream of the carburetor: 4,228,770; 4,295,458; 4,474,145; 4,690,107; and 4,879,976.

To date, these devices have not been particularly successful, particularly as far as two-cycle engines are concerned. Moreover, the insertion and/or removal of such devices is costly and time consuming.

The problem as it pertains to two-cycle engines has been highlighted by proposed emissions regulations for such engines in the State of California, which regulations could result in the outright ban of two-cycle engines in that State. Since chain saws are driven by two-cycle engines, and in light of the importance of the timber industry in California, there is great concern for the prospect of lost jobs, revenues and so on, which would significantly and negatively impact on that State's economy.

The present invention seeks to provide a simple, low cost and easy-to-install (or remove) device for two-cycle engines which improves engine efficiency through more complete combustion, resulting in increased engine rpm and a decrease in emissions.

The invention specifically relates to an insert device, referred to herein as a "tuned air insert" which is located upstream of the carburetor, preferably in a coupler which typically extends between an air cleaner and the carburetor of a two-cycle engine.

The insert itself is generally formed as a tubular member (of one or more pieces) tapering from a larger inlet side to a smaller outlet side, with or without surface irregularities, i.e., ribs, flutes, etc., formed on its interior surface. It is contemplated that tuned air inserts of various lengths and diameters will be provided for different engine models consistent with the coupler designs generally used with such engines. Thus, the couplers and-/or air cleaners could be provided with their own insert as an after-market purchase item, or the inserts can be sold separately for use with certain identified engine and/or saw models. While the inserts are described herein with specific application to two-cycle engines in chain saws, they are equally applicable with advantageous results in two-cycle engines used for other purposes as well, e.g., for driving other tools, carts, model airplanes, and the like.

It is critical in all cases that the tuned air insert be located such that its lower edge, i.e., on the outlet side, be raised above the coupler outlet and carburetor inlet, and that the coupler surrounding the tuned air insert have a diameter sufficiently greater than that of at least a portion of the insert, so as to create a chamber surrounding the insert, immediately above and open to the carburetor inlet.

The space between the lower edge of the insert and the carburetor inlet, which serves as the opening to the chamber, may be varied by sliding the insert upwardly or downwardly within the coupler. Optimum location may be determined simply as a function of engine rpm and, once determined, can be used as the standard for all similar model engines.

The use of grooves, flutes or ribs (or other surface patterns) on all or part of the interior surface of the insert is an optional feature which may have beneficial effects in some engines as a result of turbulence created in the inlet air.

In all instances experienced to date, the use of an insert as described above has resulted in a significant increase in engine rpm, evidencing more efficient and more complete combustion, and necessarily resulting in a reduction in unburned hydrocarbon emissions.

Accordingly, in its broadest aspect, the present invention comprises an insert device for mounting in a coupler extending between an air cleaner and a carburetor inlet of an internal combustion engine, the device comprising a tapered body portion extending between a larger diameter inlet end and a smaller diameter outlet end.

In another aspect, the present invention comprises: a coupling for use in connecting an air cleaner and a carburetor of an internal combustion engine, the coupling being of tubular construction having an inlet end for attachment to an outlet end of an air cleaner, and an outlet end for attachment to a planar surface surrounding an inlet of the carburetor, the outlet end of the coupling having a flat annular surface adapted for flush engagement with the planar surface; and a tubular insert within the coupling, the insert tapering in a longitudinal direction from a larger diameter inlet end to a smaller diameter outlet end, the smaller diameter outlet end terminating an adjustable distance above the flat annular surface of the coupling.

In still another aspect, the present invention comprises: an internal combustion engine having a carburetor including a carburetor inlet and an air conduit connected to the carburetor inlet for introducing air to be mixed with fuel in the carburetor, a combustion enhancing and emissions reduction device located within the air conduit, the device comprising a tubular member having interior and exterior surfaces which taper inwardly from a larger diameter inlet end, the larger diameter inlet end being engaged with the air conduit so that air flowing through the conduit is directed through the tubular member, the smaller diameter outlet end being axially spaced from the carburetor inlet so as to create a chamber open at one end and surrounding the tubular member immediately upstream of the carburetor inlet.

In terms of a process, the present invention provides a method of improving the combustion efficiency and reducing emissions in an internal combustion engine having a carburetor including a carburetor inlet and an air conduit connected to the carburetor inlet comprising the steps of:

a) establishing a primary flow path for air passing through the air conduit to the carburetor inlet;
b) establishing a chamber at leas partially surrounding the primary flow path along at least a portion of the air conduit, the chamber having an opening communicating with the primary flow path at a location immediately upstream of the carburetor inlet; and
c) adjusting the opening as a function of engine rpm.

As disclosed further herein, individual inserts will vary in design to be compatible with different two-cycle engines.

Other objects and advantages of the invention will become apparent from the detailed description which follows.

BRIEF DESCRIPTION OF THE DRAWINGS

FIG. 1 is a side view of a tuned air insert in accordance with a first exemplary embodiment of the invention;

FIG. 2 is a top plan view of the insert illustrated in FIG. 1;

FIG. 3 is a side view of a tuned air insert in accordance with a second exemplary embodiment of the invention;

FIG. 4 is a top view of the insert illustrated in FIG. 3;

FIG. 5 is a side view of a third exemplary embodiment of a tuned air insert in accordance with the invention;

FIG. 6 is a top plan view of the insert illustrated in FIG. 5;

DETAILED DESCRIPTION OF THE DRAWINGS

Figure 7:
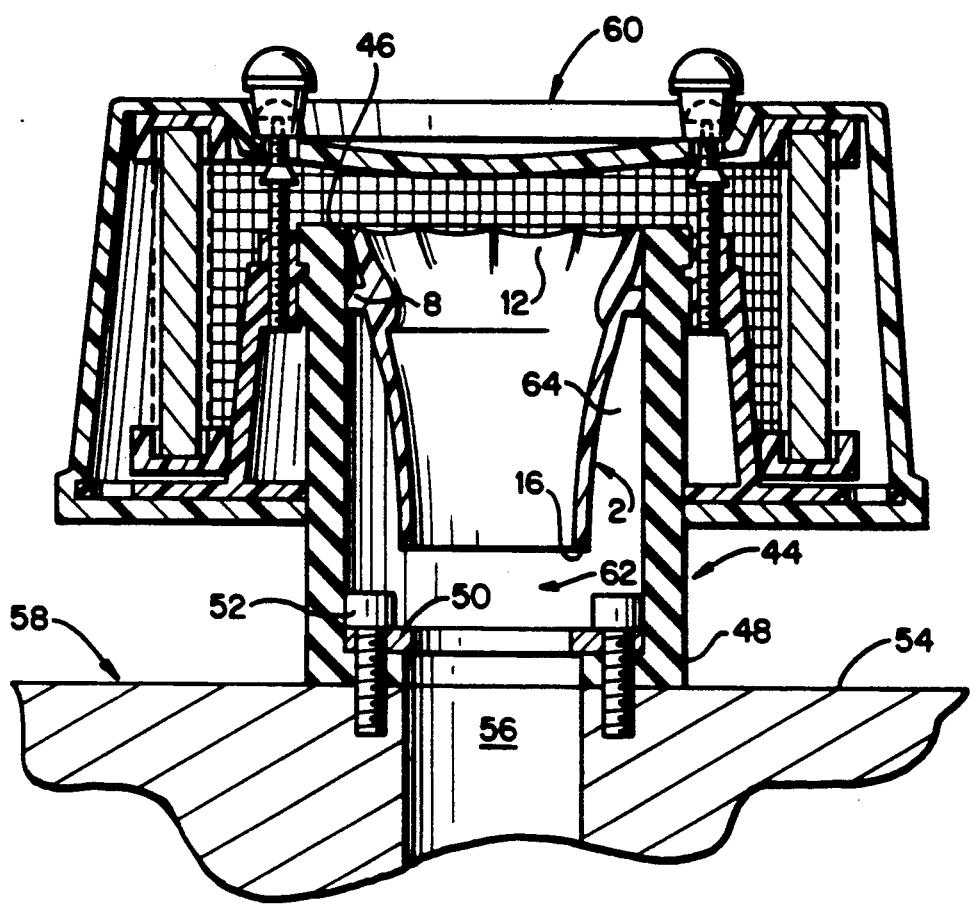
FIG. 7 is a side cross sectional view of the insert illustrated in FIG. 1 mounted within an air cleaner and associated coupling.

Referring now to FIG. 1, a tuned air insert 2 in accordance with a first exemplary embodiment of the invention includes an upper fluted portion 4, and a lower smooth portion 6. A mounting flange 8 is provided within the lower end of the fluted portion 4 to facilitate mounting within a flexible coupling as will be described further hereinbelow. The insert 2 is preferably made of plastic, and is shown to be of one-piece construction, but it will be appreciated that a multi-piece construction may also be employed.

With particular reference to FIG. 2, it may be seen that the interior of the insert 2 in the upper portion 4 is provided with a plurality of flutes or protrusions 10 spaced annularly about the upper portion of the insert. At the same time, the insert tapers generally from a larger diameter inlet end 12 to a smaller diameter outlet end 14 terminating at a lower edge 16 to thereby create a venturi effect for air flowing through the insert from the inlet end to the outlet end. The flutes 10 provided about the interior surface of the upper portion 4 of the insert cause a degree of turbulence in the air as it flows through the insert, and may enhance the mixing of fuel and air, although the presence of such ribs or flutes is optional.

The tuned air insert as described above and as illustrated in FIGS. 1 and 2 is designed for use with certain chain saw engines, and is designed to be inserted within a flexible coupling element attached to the outlet of an air filter and at the other end to the inlet of a carburetor as will be described further hereinbelow with reference to FIG. 7.

Turning now to FIGS. 3 and 4, a second exemplary embodiment of a tuned air insert 18 is illustrated. This smaller insert is designed specifically for use with very small two cycle model airplane engines, and includes a smooth, inwardly tapered outer element 20 which tapers from a larger diameter inlet end 22 to a smaller diameter outlet end 24 terminating at a lower edge 26. Smaller diameter components 28 and 30, each of which has a shorter axial length than the outer element 20, are mounted in telescoping, concentric relationship within the outer member 20 to, in effect, create a plurality of steps within the interior of the insert, thereby create turbulence in the air flowing through the insert. At the same time, and as in the case with the embodiment illustrated in FIGS. 1 and 2, the overall tapered configuration of the insert creates a venturi effect for the air flowing from the inlet end 22 to the outlet end 24.

With reference to FIGS. 5 and 6, a third exemplary embodiment of a tuned air insert 32 is illustrated which includes an upper portion 34 and a lower portion 36, the insert generally tapering inwardly from a larger diameter end 38 to a smaller diameter end 40, terminating at a lower edge 42. While both upper portion 34 and lower portion 36 are tapered, the upper portion 34 is tapered to a greater degree than the lower portion 36 to create a funnel-like shape. As best seen in FIG. 6, the interior surface of the insert 32 is substantially smooth. Thus, while a venturi effect is created during use of this embodiment, no special measures are taken in order to create turbulence.

Turning now to FIG. 7, the manner in which the tuned air insert 2 as illustrated in FIG. 1 is mounted within a particular flexible coupling extending between an air cleaner and a carburetor inlet is shown. Specifically, the insert 2 is press fit within a flexible coupling 44 so that the inlet end 12 extends substantially to the upper edge 46 of the coupling. The lower end of the coupling 48 is provided with metal reinforcing washer 50 thereby enabling the coupling to be securely fastened by screws 52 or other suitable means to an inlet surface 54 surrounding an inlet 56 of a carburetor 58. The air cleaner element 60 is one which is substantially shown and described in my earlier U.S. Pat. No. 4,871,381 issued Oct. 3, 1989 (incorporated herein by reference), and need not be described in detail here.

It is to be noted that the lower edge 16 of the insert 2 does not extend to the lower end of the coupling 44 or to the carburetor inlet 56. In other words, a space 62 is established between the lower edge 16 of the insert and the carburetor inlet 56.

This space opens to a chamber surrounding the insert so that air and/or an air fuel mixture from the carburetor 58 is drawn up into the chamber 64 which is closed at its upper end where the mounting flange 8 is friction fit within the coupling.

In order to obtain the maximum benefit from the use of the tuned air insert 2, its location within the coupling 44 must be adjusted to provide optimum results In other words, the lower edge 16 of the insert 2 may be raised or lowered relative to the carburetor inlet 56 until maximum engine rpm are achieved. Once the optimum location for the insert has been determined for a particular engine model, it may be set at that location for all engines of similar construction and design.

Figure 8:
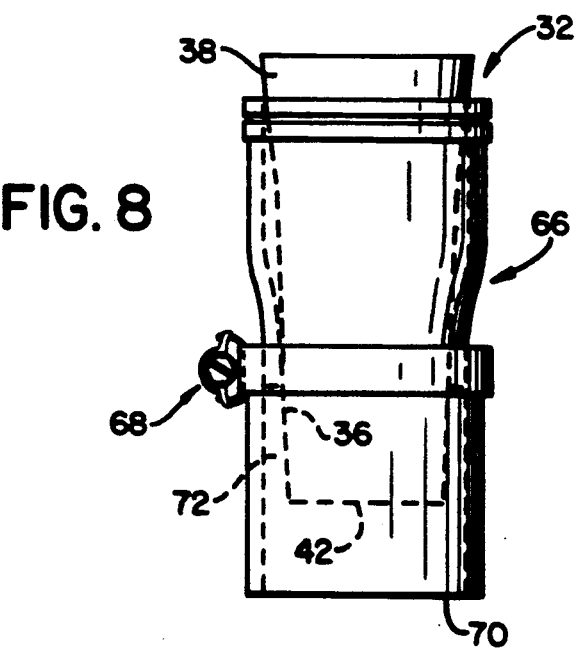
FIG. 8 is a side view of the insert illustrated in FIG. 5 mounted within a coupler element.

With reference now to FIG. 8, there is shown the tuned air insert 32 as shown in FIG. 5 mounted within a double flexible coupling 66. This coupling, may comprise two couplings generally of the type shown in FIG. 7 fastened together by a conventional ring clamp 68. The insert 32 is shown in a partially inserted position with the coupling 66 with the lower edge 42 of the insert well above the lower edge 70 of the lower coupling. In this embodiment, and after final adjustment of the insert within the coupling, tightening of the ring clamp 68 about the lower portion 36 of the insert results in a smaller chamber 72 between the insert wall and the interior coupling wall, extending axially from lower edge 42 of insert 32 to the coupling wall at the ring clamp 68. Nevertheless, the chamber size has been shown to be sufficient to achieve significant increase in engine rpm as described below.

As discussed hereinabove, different tuned air inserts can be designed for different engine sizes, brands, and so on. Thus, the embodiments shown in FIGS. 1, 2 and FIGS. 5, 6 are designed for use with chain saw engines or other larger two-cycle engines, while the embodiment illustrated in FIGS. 3 and 4 is particularly designed for very small two cycle engines typically used to power model airplanes. These are merely exemplary of the many insert designs which can be adapted for use with virtually any two-cycle engine. An adjustment process as described above is carried out initially for each insert, merely by sliding the insert within the coupling.

In general, the axial space between the lower edge of the tuned air insert and the lower edge of the coupling and/or carburetor inlet will be between about ¼ inch and ½ inch, although for larger engines with longer length couplers, an axial space of as much as 1 inch has proven to be effective.

Test results to date have indicated that engine rpm with a tuned air inserts as described hereinabove mounted between the air cleaner outlet and the carburetor inlet increases engine rpm from approximately 1500 rpm to as much as about 5,000 rpm.

While the technical reasons for the observed increase are still not fully understood, it is believed that the tuned air insert of this invention and the accompanying creation of a chamber about the insert results in fuel and air being sucked into the chamber as a result of the vacuum created in the chamber by air flowing through the venturi and past the chamber opening. This appears to provide more thorough mixing of the fuel and air which, in turn, facilitates increased combustion efficiency, i.e., more complete burning, an increase in engine rpm, and a reduction in harmful emissions.

EXAMPLE NO. 1

A Stihl 064 chain saw, with carburetor adjusted to run rich, and with the air cleaner removed, ran at a maximum 10,000 rpm without a tuned air insert, and at a maximum 11,800 rpm with a tuned air insert of the type shown in FIG. 1, with a clearance between the lower edge of the insert and the lower edge of the coupler of about ¼ to ⅜ inch.

EXAMPLE NO. 2

A stock Solo 603 chain saw, without air cleaner, ran at a maximum 11,500 rpm without a tuned air insert, and at a maximum 12,900 rpm without an air cleaner but with a tuned air insert of the type illustrated in FIG. 5, again with a clearance of between about ¼ and ⅜ inch.

EXAMPLE NO. 3

A Husgvarna 181 chain saw, modified by enlarging the carburetor and increased compression ratio, ran at a maximum of 10,200 rpm without an air cleaner or tuned air insert, and at maximum rpm of between 11,600 and 13,900 with a tuned air insert of the type shown in FIG. 1, and depending on the adjusted location of the insert.

EXAMPLE NO. 4

A stock Jonesered 2094 chain saw ran at a maximum 9000 rpm without air cleaner or tuned air insert, and at a maximum rpm of 11,300 with a tuned air insert and air cleaner of the type shown in FIG. 7, with a clearance of about 3/16 inch.

EXAMPLE NO. 5

A stock Honda Oddessy cart driven by a 250 cc two-cycle Honda engine, ran at a maximum 14,700 rpm without air cleaner, and at a maximum 20,300 rpm without air cleaner but with a tuned air insert of the type illustrated in FIG. 1, with a clearance of about ¼ to ⅜ inch.

From the above, and with reference to FIG. 7 as an example, it will be appreciated that the invention also relates to a process for improving combustion efficiency and reducing emissions in an internal combustion engine having a carburetor 58 including a carburetor inlet 56 and an air conduit 44 connected to the carburetor inlet at one end and to an air cleaver 60 at the other end. An exemplary process includes the steps of:

a) providing an open-ended tubular insert 2 having an upper end 4 with a diameter sufficient to engage an interior surface of the air conduit or coupling 44 and a lower end 6 with a diameter creating a radial space between the insert 2 and the interior surface of the air conduit or coupling;

b) locating the insert 2 within the air conduit or coupling 44 such that, in use, the lower edge 16 of the tubular insert 2 is spaced axially from the carburetor inlet 56 to thereby create a chamber 64 open at one end adjacent the inlet 56 and surrounding at least a portion of the tubular insert; and c) moving the tubular insert 2 axially within the air conduit or coupling 64 to determine an optimum location thereof relative to the carburetor inlet 56 as a function of engine rpm.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An insert device for mounting in a coupler extending between an air cleaner and a carburetor inlet of an internal combustion engine, said device comprising a tapered body portion extending between a larger diameter inlet end and a smaller diameter outlet end.

2. An insert device according to claim 1 wherein means are provided in at least an upper portion of the device for creating turbulence in air flowing through the device when mounted in the coupler.

3. An insert device according to claim 2 wherein said means comprises a plurality of flutes.

4. An insert device according to claim 1 wherein a mounting flange is provided in said upper portion.

5. An insert device according to claim 1 wherein an interior surface comprises a plurality of stepped portions.

6. An insert device according to claim 1 wherein said tapered body portion includes an upper portion and a lower portion, said upper portion having a greater degree of taper than said lower portion.

7. An insert device according to claim 6 wherein interior surfaces of said device are substantially smooth.

8. A coupling for use in connecting an air cleaner and a carburetor of an internal combustion engine, the coupling being of tubular construction having an inlet end for attachment to an outlet end of an air cleaner, and an outlet end for attachment to a planar surface surrounding an inlet of the carburetor, the outlet end of the coupling having a flat annular surface adapted for flush engagement with said planar surface; and a tubular insert within the coupling, said insert tapering in a longitudinal direction from a larger diameter inlet end to a smaller diameter outlet end, said smaller diameter outlet end terminating an adjustable distance above said flat annular surface of the coupling.

9. The coupling of claim 8 wherein the insert is press fit within the coupling, with friction engagement between the larger diameter inlet end of the insert and an interior surface of the inlet end of the coupling.

10. The coupling of claim 9 wherein the insert is slidable within the coupling to vary said distance.

11. The coupling of claim 8 wherein the insert is formed with a smooth, tapered interior surface.

12. The coupling of claim 8 wherein the insert is formed with a tapered interior surface, at least a portion of which is provided with a plurality of ribs arranged about the interior of the insert and extending in the longitudinal direction of the insert.

13. The coupling of claim 8 wherein the insert is formed with an interior surface provided with a plurality of longitudinally spaced annular steps.

14. The coupling of claim 9 wherein said insert below said larger diameter inlet end does not engage said coupling.

15. In an internal combustion engine having a carburetor including a carburetor inlet and an air conduit connected to said carburetor inlet for introducing air to be mixed with fuel in the carburetor, a combustion enhancing and emissions reduction device located within said air conduit, said device comprising a tubular member having interior and exterior surfaces which taper inwardly from a larger diameter inlet end, said larger diameter inlet end being engaged with said air conduit so that air flowing through the conduit is directed through the tubular member, said smaller diameter outlet end being axially spaced from said carburetor inlet so as to create chamber open at one end and surrounding said tubular member immediately upstream of said carburetor inlet.

16. The internal combustion engine according to claim 15 wherein said tubular member is slidable within said air conduit to vary the axial spacing between said smaller diameter outlet end and said carburetor inlet.

17. The internal combustion engine according to claim 15 wherein said tubular member is formed with a smooth, tapered interior surface.

18. The internal combustion engine according to claim 15 wherein said tubular member is formed with a tapered interior surface, at least a portion of which is provided with a plurality of ribs arranged about the interior of the insert and extending in the longitudinal direction of the insert.

19. The internal combustion engine according to claim 15 wherein the tubular member is formed with an interior surface provided with a plurality of longitudinally spaced annular steps.

20. The internal combustion engine according to claim 15 wherein said engine is a two-cycle engine.

21. A method of improving combustion efficiency and reducing emissions in an internal combustion engine having a carburetor including a carburetor inlet and an air conduit connected to said carburetor inlet comprising the steps of:

a) providing an open-ended tubular insert having an upper end with a diameter sufficient to engage an interior surface of said air conduit and a lower end with a diameter creating a radial space between said insert and said interior surface of said air conduit; and b) locating said tubular insert within said air conduit such that, in use, said lower end of said tubular insert is spaced axially from the carburetor inlet to thereby create a chamber open at one end adjacent said inlet and surrounding at least a portion of said tubular insert.

22. The method of claim 21 and including the step of:
   c) moving said tubular insert axially within said conduit to determine optimum location thereof relative to said carburetor inlet as a function of engine rpm.

23. The method of claim 21 and including the step of creating a venturi effect in said air conduit during step (b).

24. A method of improving the combustion efficiency and reducing emissions in an internal combustion engine having a carburetor including a carburetor inlet and an air conduit connected to said carburetor inlet comprising the steps of:
   a) establishing a primary flow path for air passing through said air conduit to said carburetor inlet;
   b) establishing a chamber at least partially surrounding said primary flow path along at least a portion of said air conduit, the chamber having an opening communicating with said primary flow path at a location immediately upstream of the carburetor inlet; and
   c) adjusting the opening as a function of engine rpm.

25. The method of claim 24 wherein step (a) and step (b) are carried out by locating a tapered insert within the air conduit, a lower end of said insert being axially spaced from said carburetor inlet.

26. The method of claim 25 wherein said tapered insert tapers inwardly from a inlet end to an outlet end to establish a venturi in said primary flow path.

27. The method of claim 26 and including the step of providing a plurality of axially oriented projections on an interior peripheral surface of said insert.

* * * * *